3,076,007
ORGANIC ISOCYANATE PREPARATION
Robert Barclay, Jr., and Raymond P. Kurkjy, New Brunswick, N.J., assignors to Union Carbide Corporation, a corporation of New York
No Drawing. Filed Aug. 29, 1958, Ser. No. 757,913
6 Claims. (Cl. 260—453)

This invention relates to a method for preparing organic isocyanates and, more particularly, to a method for preparing organic isocyanates employing ethylene carbonate as the starting material.

Heretofore, organic isocyanates have been produced by the reaction of phosgene and an amine in an inert organic solvent such as chlorobenzene, toluene, or xylene. The intermediate reaction product is treated with additional phosgene to form a crude isocyanate product corresponding to the amine. After removal of the unreacted phosgene and the hydrogen chloride from the crude reaction product, the isocyanate is obtained by distilling off the solvent. A variation of this method uses an amine hydrochloride, either with or without a boron trifluoride catalyst. It is also known to react phosgene with amines to give carbamic acid chlorides which are treated with a basic compound to remove hydrogen chloride to obtain the isocyanate.

These methods enjoy considerable commercial success but are disadvantageous in many respects, primary among which is their use of phosgene and their production of HCl. Phosgene, either formed during the reaction or introduced as a gas, is of necessity present in great excess in these reactions and is a dangerous toxicological hazard. In addition, these reactions HCl is present in the equipment at very high temperatures and the cost of corrosion resistant equipment and frequent replacement of parts is a serious economic drawback to the use of these reactions.

Methods have been proposed which eliminate the use of phosgene, but none have found the commercial acceptance accorded the phosgene reaction because of the cost of starting materials, unusual reaction conditions required, poor yields, and the unpredictability of reaction results caused by a number of side reactions. For example, the reaction of a metal azide and an acid halide produces an acid azide which, when heated in an inert solvent decomposes, yielding an isocyanate. The thermal decomposition of even low molecular weight acid azides is quite hazardous, and close control of the amount of solvent present and of the decomposition rate itself is required. For these reasons the use of acid azides is not commercially practicable or especially desirable.

Still another method prepares isocyanates by pyrolyzing an N-alkyl, N-alkoxyalkyl, or N-alkoxyalkoxyalkyl carbamate in the presence of a basic catalyst thereafter separating the isocyanic ester from the pyrolysis product before the carbamate is reformed. The preparation of all these carbamates, however, requires the use of phosgene. Thus, for example, an alcohol can be reacted with phosgene to obtain the alkyl chloroformate which is, in turn, reacted with an amine to yield the desired urethane. Alternatively, the amine can be reacted directly with phosgene and the carbamic acid chloride obtained reacted with an alcohol to yield the urethane. The use of these procedures while enabling the production of urethanes at comparatively low temperatures and thereby lessening to some degree the corrosive effects of the HCl, does not avoid the corrosion problem entirely and the toxicological difficulties inherent in the use of phosgene remain.

It is an object of the present invention, therefore, to provide a method for preparing isocyanates by a non-toxic, safe, easily effected, inexpensive reaction of readily available materials.

According to the present invention, the above objects are accomplished by heating a hydroxyurethane having the formula

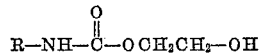

wherein R is an alkyl or cycloalkyl group, to a temperature sufficient to initiate the decomposition of the hydroxyurethane into an isocyanate and a glycol, but below a temperature causing decomposition or polymerization of the isocyanate and separating the isocyanate thus formed. Preferably the temperature should be at least sufficient to vaporize substantially all of the isocyanate produced so as to facilitate the removal of the isocyanate from the reaction mass and prevent recombination with the glycol. In this case the isocyanate containing vapors are preferably chilled to prevent polymerization and/or recombination with any glycol appearing in the distillate, although other methods of slowing the recombination reaction, such as by the use of inhibitors against the reaction, can be employed, if desired. We particularly prefer the method of chilling the distillate to a temperature low enough to prevent the recombination reaction and then separating any glycol carried over in the distillate from the isocyanate by washing or extraction.

In carrying out this pyrolysis of this invention, temperatures between about 100° C. to 300° C. have given good results, depending to some extent on the pressure employed. Temperatures in excess of about 300° C. are undesirable from the standpoint of product yield and purity as well as from a control standpoint. Generally, it is desirable to employ subatmospheric pressures in the reaction, thereby avoiding excessively high temperatures which may cause polymerization or decomposition of the isocyanate, while at the same time facilitating the separating of the isocyanate vapors from the reaction mass. For this purpose, pressures below about 100 mm. Hg. are preferred. Particularly good results are secured with this process when pressures of about 25 mm. Hg and below are employed with temperatures of about 150° C. to 275° C.

The hydroxyurethanes employed in the present invention are readily obtained by known methods. Principal among these methods is the reaction of ethylene carbonate with a primary alkyl or cycloalkyl monoamine. While any alkyl or cycloalkyl primary monoamine can be employed in this process, the amines containing up to about 12 carbon atoms are preferred for maximum yields and ease and convenience in carrying out the reaction.

Such amines as cyclohexyl amines and the lower alkyl substituted cyclohexyl amines as well as the lower alkyl amines such as methyl, ethyl, propyl, butyl, hexyl, ethylhexyl amines, and the like containing up to about 12 carbon atoms are within this preferred class.

The preparation of the hydroxyurethanes is suitably carried out by admixing the amine and the ethylene carbonate, preferably in the presence of a solvent or mixture of solvents and without need of a catalyst. Water and aromatic hydrocarbons such as benzene, toluene, etc. are suitable solvents where the reaction is carried out at temperatures of about 50° C. Where highly volatile amines are employed, however, lower temperatures may be more desirable. Preferably, the reaction temperatures are in the range of 0° C. to about 60° C. The reaction is somewhat exothermic and means for regulating the reaction temperature by removing the heat either by external or internal cooling means is often required. The hydroxyurethane produced in the reaction is preferably purified by recrystallization from the reaction solvent, if employed, or by distillation or other suitable means to remove unreacted amine if the reaction is not carried out to completion.

A particularly desirable embodiment of this invention is in the formation in situ of the hydroxyurethane and immediately conducting the pyrolysis. Thus, in effect, it is possible to form the isocyanates by one reaction scheme, i.e. adding the amine and ethylene carbonate together at a low temperature, permitting the reaction to go to completion, raising the temperature to the point where decomposition of the hydroxyurethane into isocyanate and glycol begins, and removing the isocyanate and separating the glycol and isocyanate products.

The hydroxyurethanes in the pyrolysis reaction of the invention generally undergo several competing reactions simultaneously, illustrated as follows:

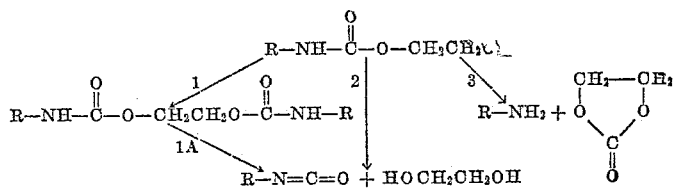

In this process, Reaction 2 is the desirable reaction and predominates to yield the isocyanate and glycol directly. Reactions 1 and 1A also yield the isocyanate, but through an intermediate reaction. 1 is of little significance in the above reaction but would proceed rapidly in the pyrolysis of bis(hydroxyurethanes) to form the polyurethane and inhibit or prevent the formation or recovery of any isocyanate. Reaction 3 is highly undesirable in this process since the amine produced reacts with the isocyanate produced in Reaction 2 to irreversibly form a urea. This somewhat reduces the yields of isocyanate recovered, but the urea produced can be recovered at the completion of the pyrolysis reaction.

If desired, the pyrolysis reaction can be materially hastened by the use of basic catalysts, such as those forming aqueous solutions having a pH of 8.0 or higher. Particularly desirable basic compounds are the alkali metal and alkaline earth metal compounds, preferably the oxides, hydroxides, carbonates and the like of alkali metals and alkaline earth metals. While tertiary amines can also be used, only fair yields of the isocyanate are secured except at the higher pyrolysis temperatures which could lead to decomposition or polymerization of the isocyanate.

It is generally necessary to add only enough of such compounds to the extent of 1 to 10% by weight of the reaction mass. The use of such catalysts is not necessary for the practice of the invention, however, for the pyrolysis reaction readily proceeds without their use.

As hereinbefore stated, the isocyanate produced must be separated from the glycol to prevent reformation of the hydroxyurethane and formation of polyurethanes. Preferably this is accomplished by distilling overhead the isocyanate vapors and condensing the vapors. In most instances, however, some glycol will be distilled over with the isocyanate, particularly where the isocyanate vaporizes at about the same temperature as the glycol. If desired, the entire reaction mass can be decomposed and the glycol and isocyanate can be distilled over. In such instances it is desirable that the vapors be removed and immediately chilled, either in a condenser attached to the top of the column in which the pyrolysis is taking place, or in a dry ice trap or the like, so as to prevent the recombination of the isocyanate and the glycol, and the reformation of urethanes. The chilled distillate is dissolved in a water immiscible solvent inert to the isocyanate such as an alkyl ether, e.g., diethyl ether or a hydrocarbon such as petroleum ether. The distillate solution is then washed with water. Several washings or extractions with water have been found to extract substantially all of the glycol by-product and prevent recombination later in the work-up of the isocyanate.

Separation of the organic layer of these washings or extractions, and drying, preferably with a desiccant such as $MgSO_4$ provides, after either distillation or crystallization, an isocyanate product in relatively pure form. Other separation and recovery procedures, however, such as fractional distillation, selective crystallization or absorption as are obvious to those skilled in the art can also be employed, and the above descriptions of specific separation and recovery steps are not to be construed as intended to limit the invention.

When the process is conducted within the preferred limits hereinbefore set forth, yields of 70 to 90 percent are easily achieved, particularly if the interfering by-product forming reactions of the pyrolysis step are avoided or minimized. The isocyanates secured thereby are of good purity generally having sharp melting points within a degree or two. For laboratory analysis, the yield of isocyanate can be determined accurately by taking the organic phase of the washing step, adding an amine to form the urea which is insoluble in the ether and can be filtered off and weighed to give a weight of urea from which the yield of isocyanate can be calculated. For practical applications, however, it is desirable to obtain the isocyanate in pure form from the glycol-free solution. This can be done by fractional distillation or crystallization techniques depending principally on the particular isocyanate produced, its boiling point and solubility characteristics, and the particular recovery method employed.

The following examples are illustrative of this invention.

*Example 1*

A mixture of 1.50 moles (132 grams) of ethylene carbonate and 1.51 moles (150 grams) of cyclohexylamine was heated with stirring during a 40 minute period. Cooling water was employed to maintain the temperature of the exothermic reaction between 50° and 55° C. The reaction mixture was stirred for 5 additional hours at 45° to 55° C. and allowed to stand overnight. After recrystallization from a mixture of 250 ml. of benzene and 1000 ml. of cyclohexane 264.4 g. of 2-hydroxyethyl cyclohexanecarbamate, M.P. 64° C. to 66° C. was obtained.

30.0 gms. of the 2-hydroxyurethane produced above and 1.2 gms. of calcium oxide as a catalyst were placed in a flask equipped with a thermometer and a fractionating column. Pyrolysis was carried out by initially heating the contents of the flask to about 160° C. at a pressure of 8 mm. The temperature gradually rose to about 205° C. in about 35 minutes during which time the vapors, containing both the isocyanate and the glycol, were being removed. The distillate was immediately chilled to below 0° C., and dissolved in 75 ml. of ether. The cold solution was washed with several small portions of water totaling 50 ml., and the organic layers containing the isocyanate were dried with $MgSO_4$.

Cyclohexyl isocyanate is a volatile and highly reactive liquid and, therefore, the yield could not be easily or accurately determined by direct measurement after isolation. The yield was therefore determined in the following manner:

16 gm. of cyclohexylamine were added to form sym-dicyclohexyl urea according to the formula:

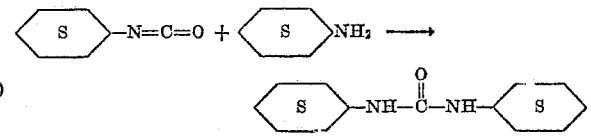

The solution was allowed to stand overnight and the precipitated sym-dicyclohexyl urea was filtered off, washed with ether and dried. The urea recovered weighed 22.28 gms. The yield of cyclohexyl isocyanate therefore was:

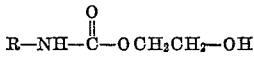=12.4 gms. or 62%

Example II

The procedure of Example I was followed using 18.7 gm. of 2-hydroxyethyl cyclohexanecarbamate and 1.3 gms. of calcium carbonate. The components were heated to 192°–218° C. at 22–23 mm. Hg. The cold distillate was dissolved immediately in 75 ml. of ether, and the solution was washed with five 10-ml. portions of water and dried over MgSO$_4$. Addition of an excess of cyclohexylamine resulted in precipitation of 14.40 gms. of sym-dicyclohexyl urea, or a 64% yield of isocyanate.

Example III

A mixture of 32.2 g. of 2-hydroxyethyl butylcarbamate and 1.5 g. of calcium oxide was heated at 150–190° C. and 8 mm. pressure. The distillate was cooled and dissolved in 90 ml. of ether, and the solution was washed with five 10-ml. portions of water. The combined aqueous washings were re-extracted with ether, and the ether solutions containing the isocyanate were combined and dried over MgSO$_4$. An excess of aniline was added, and the mixture was allowed to stand at room temperature for 43 hours. The yield of precipitated N-butyl-N'-phenylurea, M.P. 124–126°, was 8.93 g., corresponding to an isocyanate yield of 23%. The presence of additional N-butyl-N'-phenylurea in the filtrate was detected by infrared analysis, but the amount could not be accurately determined.

The use of a basic compound having a pH above about 8.0 as a catalyst is not essential to the method of our invention but does enable better yields in most instances than would otherwise be obtained.

What is claimed is:

1. Method for preparing primary alkyl and cycloalkyl monoisocyanates including the steps of heating an hydroxy urethane having the formula $$R-NH-\overset{O}{\underset{\|}{C}}-OCH_2CH_2-OH$$

wherein R is a member selected from the group consisting of primary alkyl and cycloalkyl radicals having up to 12 carbon atoms to a temperature between about 100 and 300° C. under a pressure of less than 100 mm. Hg to form a monoisocyanate having the formula $$R-N=C=O$$

where R has the significance given above and ethylene glycol, cooling said monoisocyanate and ethylene glycol to a temperature at which their recombination to form an hydroxy urethane is substantially prevented, and thereafter isolating said monoisocyanate.

2. The method claimed in claim 1 wherein the pressure is maintained below 25 mm. Hg and the temperature between 150 and 275° C.

3. The method claimed in claim 1 wherein pyrolysis is carried out in the presence of a basic catalyst selected from the group consisting of basic alkali metal and alkaline earth metal compounds and tertiary amines.

4. The method of claim 1 wherein said primary alkyl and cycloalkyl monoisocyanate produced is separated by being chilled to a temperature sufficient to substantially prevent recombination of the decomposition products into said hydroxy urethane and said glycol is extracted by washing the decomposition products in water.

5. The method claimed in claim 2 wherein the hydroxy urethane is 2-hydroxyethyl cyclohexanecarbamate.

6. The method claimed in claim 2 wherein the hydroxy urethane is 2-hydroxyethyl butylcarbamate.

References Cited in the file of this patent

UNITED STATES PATENTS

| | | |
|---|---|---|
| 2,409,712 | Schweitzer | Oct. 22, 1946 |
| 2,713,591 | Bortnick | July 19, 1955 |
| 2,755,286 | Bell et al. | July 17, 1956 |
| 2,915,550 | Bell et al. | Dec. 1, 1959 |

OTHER REFERENCES

Petersen, Ann. 562 (1949), page 208.

Bayer: Angewandte Chemie A59 (1947), 265. (Copies of above in Scientific Library, photocopies in 260–453A.)